US012685255B2

(12) United States Patent
Pickens

(10) Patent No.: US 12,685,255 B2
(45) Date of Patent: Jul. 21, 2026

(54) LAWNMOWER CLIPPING CHUTE ASSEMBLY

(71) Applicant: Tyrone Pickens, Indianapolis, IN (US)

(72) Inventor: Tyrone Pickens, Indianapolis, IN (US)

( * ) Notice: Subject to any disclaimer, the term of this patent is extended or adjusted under 35 U.S.C. 154(b) by 358 days.

(21) Appl. No.: 18/379,542

(22) Filed: Oct. 12, 2023

(65) Prior Publication Data

US 2025/0120340 A1 Apr. 17, 2025

(51) Int. Cl.
*A01D 34/71* (2006.01)
*A01D 101/00* (2006.01)

(52) U.S. Cl.
CPC .......... *A01D 34/71* (2013.01); *A01D 2101/00* (2013.01)

(58) Field of Classification Search
CPC ...... A01D 34/00–34/905; A01D 43/00–43/16; A01D 2101/00
See application file for complete search history.

(56) References Cited

U.S. PATENT DOCUMENTS

| | | | | |
|---|---|---|---|---|
| 3,875,729 | A * | 4/1975 | Partsch | A01D 34/49 56/192 |
| D255,573 | S | 6/1980 | Cox | |
| 4,897,988 | A | 2/1990 | Schweitz | |
| 5,033,260 | A | 7/1991 | Jerry | |
| 5,398,491 | A | 3/1995 | Hartley | |
| 5,606,851 | A * | 3/1997 | Bruener | A01D 34/6806 56/10.8 |
| 5,873,225 | A * | 2/1999 | Schaedler | A01D 43/077 56/16.9 |
| 6,971,224 | B1 | 12/2005 | Hancock | |
| 8,555,608 | B2 | 10/2013 | Geiger | |
| 8,857,145 | B2 * | 10/2014 | Volovsek | A01D 34/68 56/320.2 |
| 10,045,481 | B2 | 8/2018 | Chase | |
| 10,638,662 | B2 * | 5/2020 | Spitz | A01D 42/005 |
| 11,805,727 | B1 * | 11/2023 | Engelen | A01D 34/71 |
| 11,844,306 | B2 * | 12/2023 | Marolla | A01D 34/005 |
| 2003/0182919 | A1 * | 10/2003 | Baumann | A01D 34/71 56/320.1 |
| 2014/0318099 | A1 * | 10/2014 | Thorman | A01D 42/005 56/320.2 |
| 2018/0007829 | A1 * | 1/2018 | Lopez | A01D 43/063 |
| 2024/0114828 | A1 * | 4/2024 | Zehentbauer | A01D 43/063 |
| 2025/0255216 | A1 * | 8/2025 | Yamaoka | A01D 34/81 |

FOREIGN PATENT DOCUMENTS

WO WO-2010055535 A1 * 5/2010 ............. E04H 12/08

OTHER PUBLICATIONS

Toro Side Discharge Chute Installation Instructions (Year: 2021).*

* cited by examiner

*Primary Examiner* — Joseph M Rocca
*Assistant Examiner* — Madeline I Runco

(57) ABSTRACT

A lawnmower clipping chute assembly includes a chute that is mountable to a deck of a push lawnmower having the chute being aligned with an output port of the deck. In this way the chute can capture grass clippings produced by the push lawnmower in lieu of a collection bag of the push lawnmower. The chute is curved such that the chute is directed laterally from the deck to direct the grass clippings laterally from the deck. A rod is attachable to the chute such that the rod extends laterally across the chute. Additionally, the rod is positionable in each of a pair of collection bag mounts on the deck of the lawnmower for mounting the chute to the deck.

7 Claims, 9 Drawing Sheets

LAWNMOWER CLIPPING CHUTE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to clipping chute devices and more particularly pertains to a new clipping chute device for facilitating grass clippings to be directed laterally away from a push lawnmower. The device includes a chute that is curved which can be mounted to a deck of a push lawnmower having the chute being aligned with an output port in the deck. The device includes a rod that is attached to the chute which is positionable in collection bag mounts that are disposed on the deck for retaining the chute on the deck.

(2) Description of Related Art Including Information Disclosed Under 37 CFR 1.97 and 1.98

The prior art relates to clipping chute devices including a variety of clipping chutes that are attachable to the deck of a lawnmower with fasteners that engage the deck of the lawnmower for directing grass clippings laterally away from the deck. In no instance does the prior art disclose a clipping chute device that includes a curved chute that is mountable to a deck of a lawnmower and a rod attached to the curved chute that engages collection bag mounts on the lawnmower for removably securing the curved chute to the deck.

BRIEF SUMMARY OF THE INVENTION

An embodiment of the disclosure meets the needs presented above by generally comprising a chute that is mountable to a deck of a push lawnmower having the chute being aligned with an output port of the deck. In this way the chute can capture grass clippings produced by the push lawnmower in lieu of a collection bag of the push lawnmower.

The chute is curved such that the chute is directed laterally from the deck to direct the grass clippings laterally from the deck. A rod is attachable to the chute such that the rod extends laterally across the chute. Additionally, the rod is positionable in each of a pair of collection bag mounts on the deck of the lawnmower for mounting the chute to the deck.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
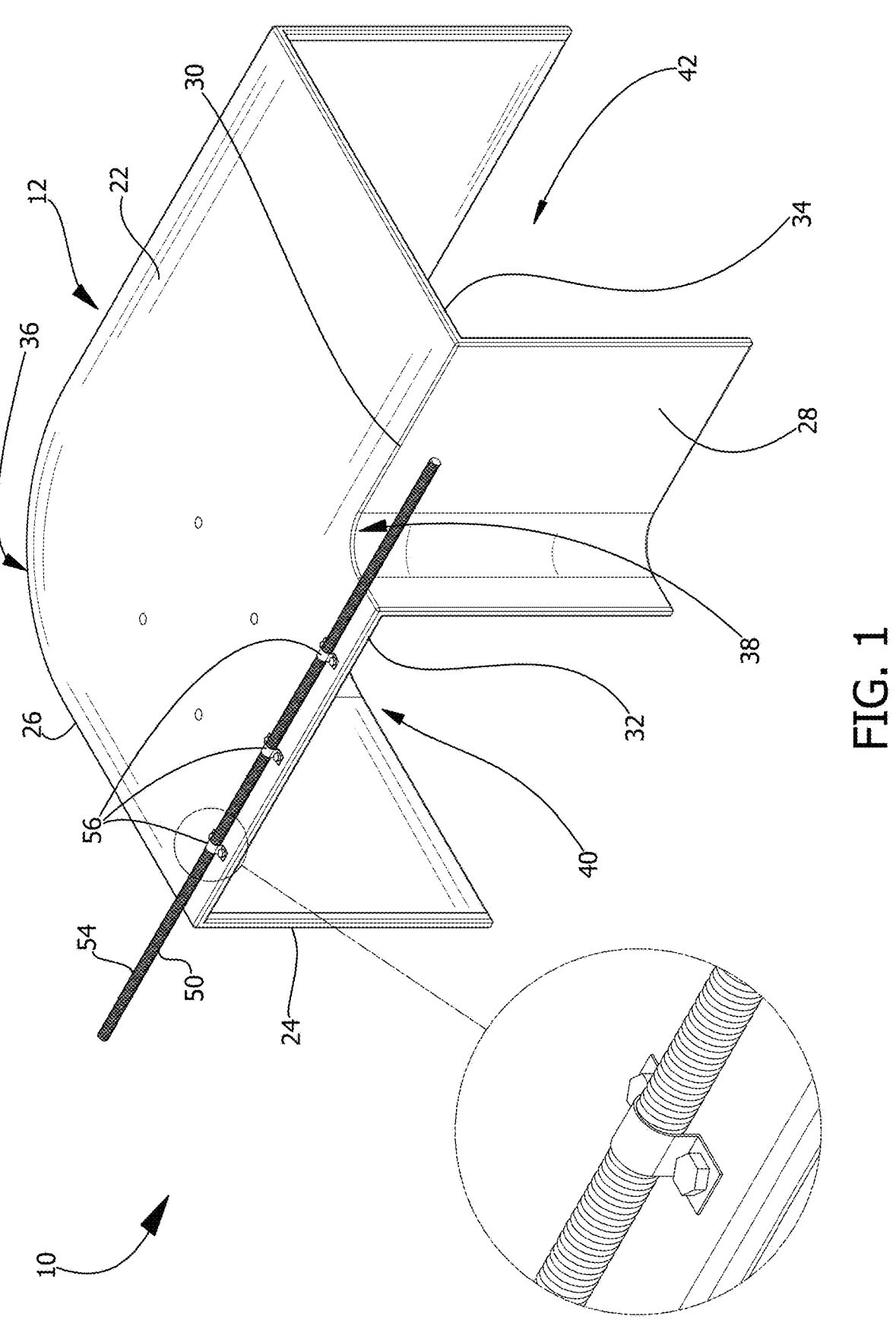
FIG. 1 is a top perspective view of a lawnmower clipping chute assembly according to an embodiment of the disclosure.
Figure 2:
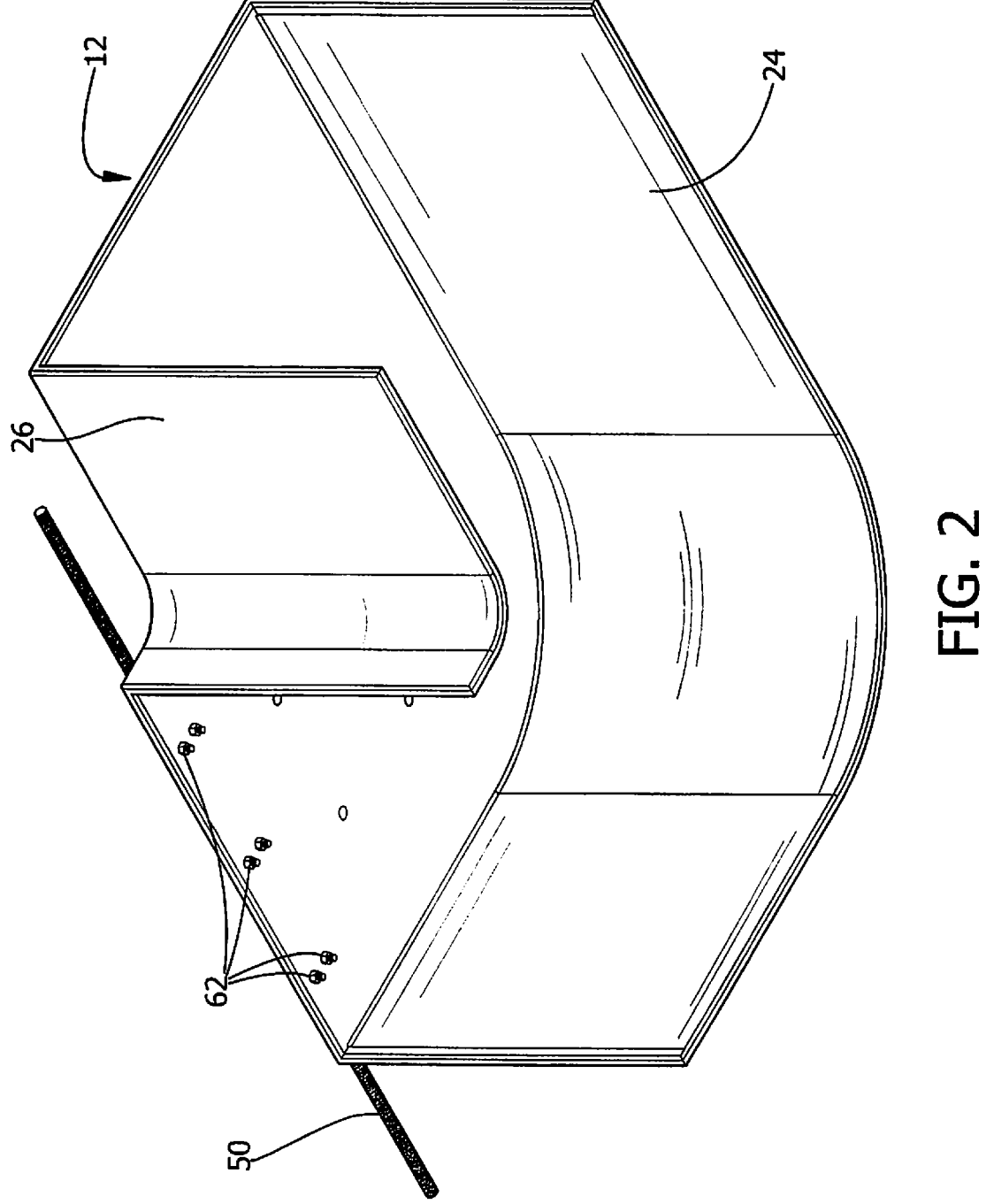
FIG. 2 is a bottom perspective view of an embodiment of the disclosure.
Figure 3:
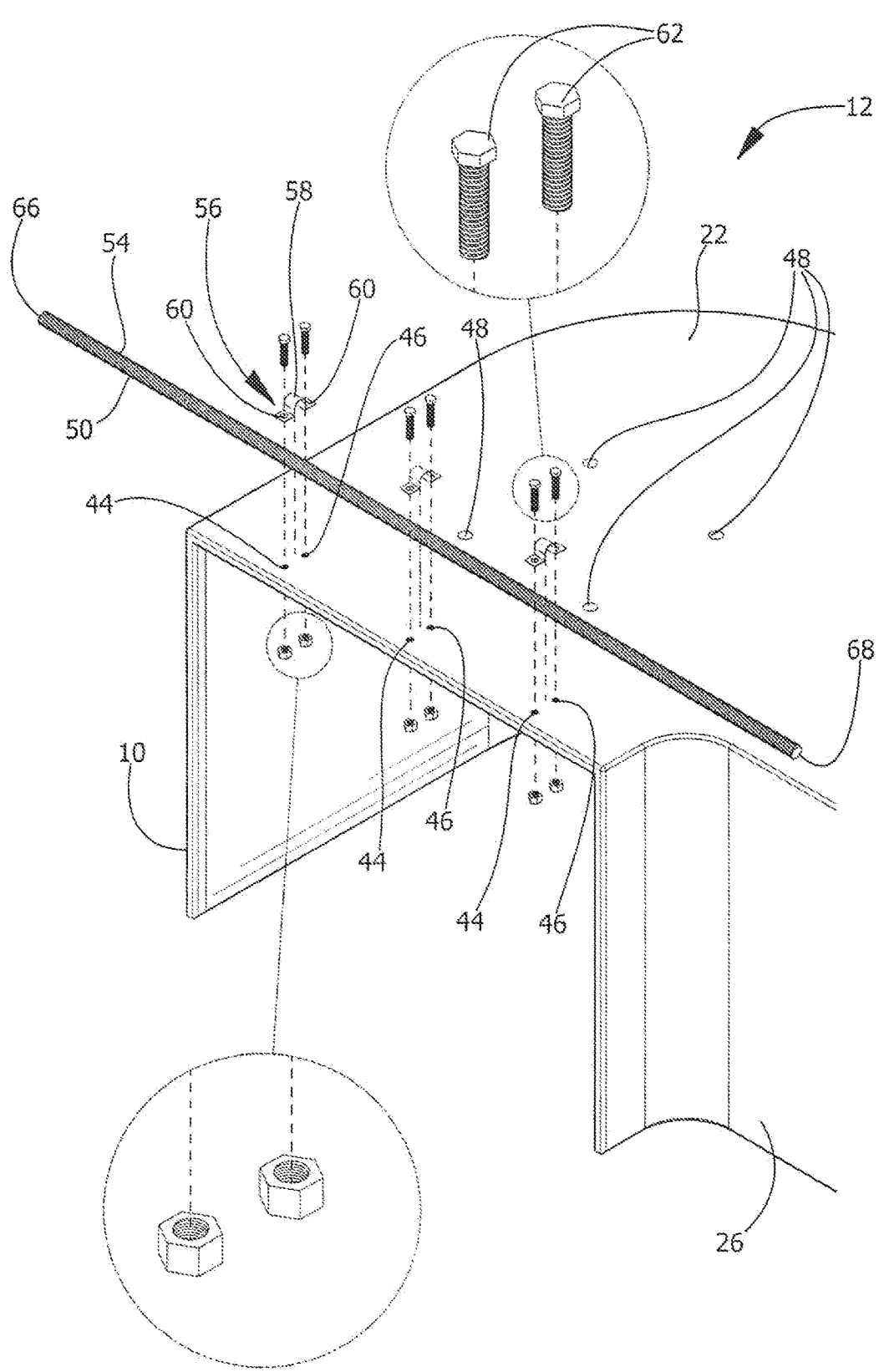
FIG. 3 is an exploded perspective view of an embodiment of the disclosure.
Figure 4:
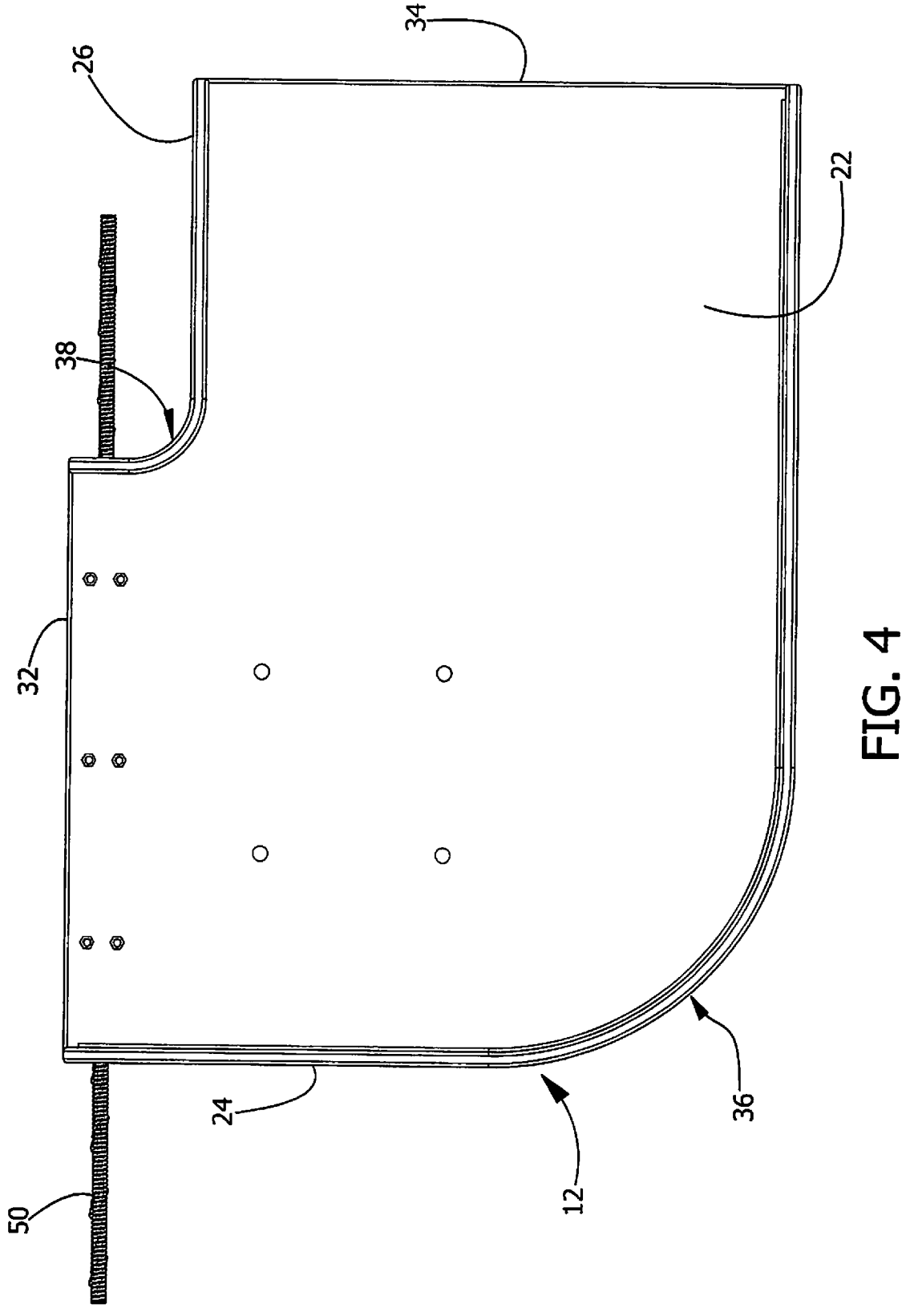
FIG. 4 is a bottom view of an embodiment of the disclosure.
Figure 5:
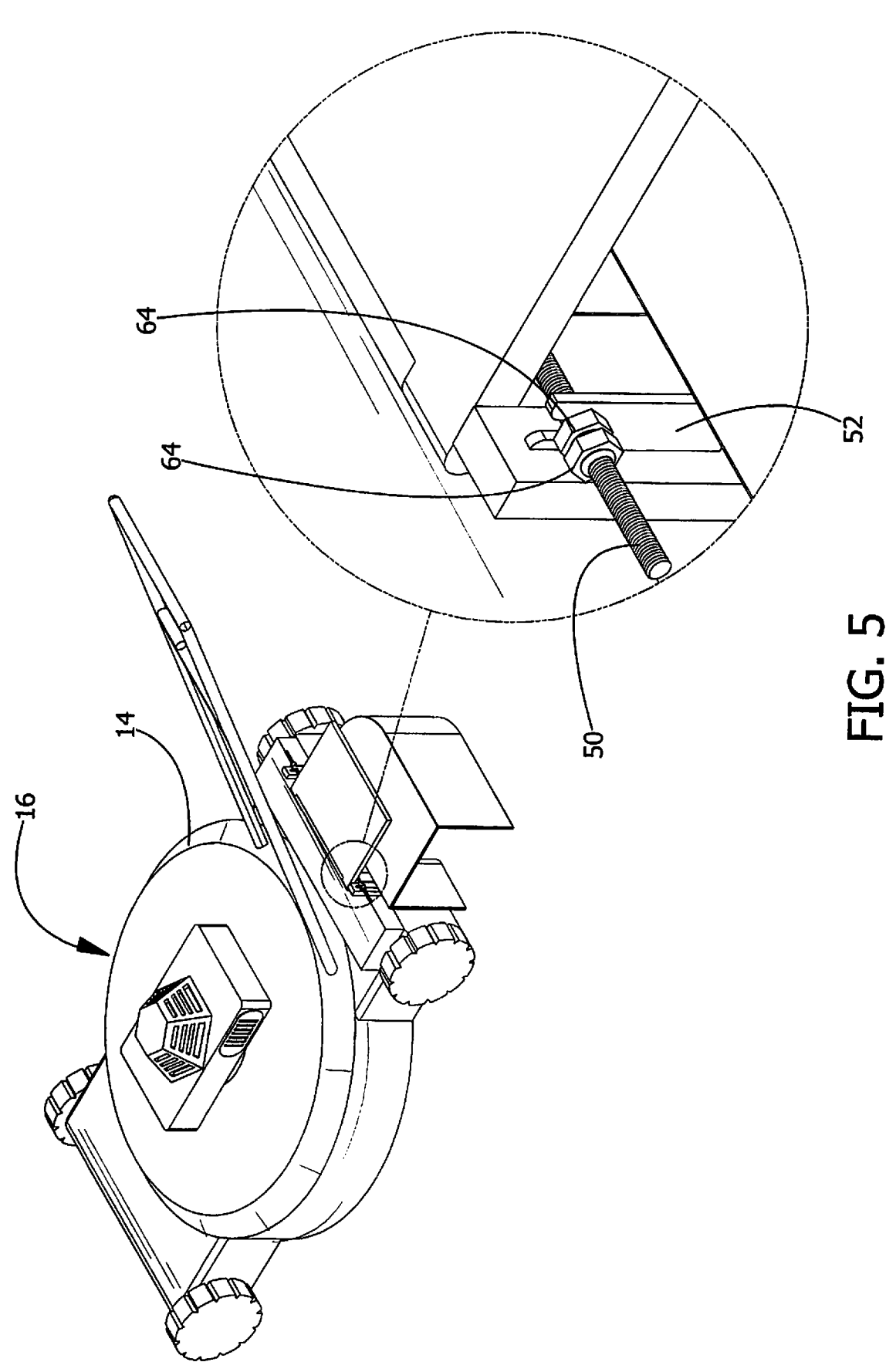
FIG. 5 is a top perspective in-use view of an embodiment of the disclosure showing a chute being mounted to a deck of a lawnmower.
Figure 6:
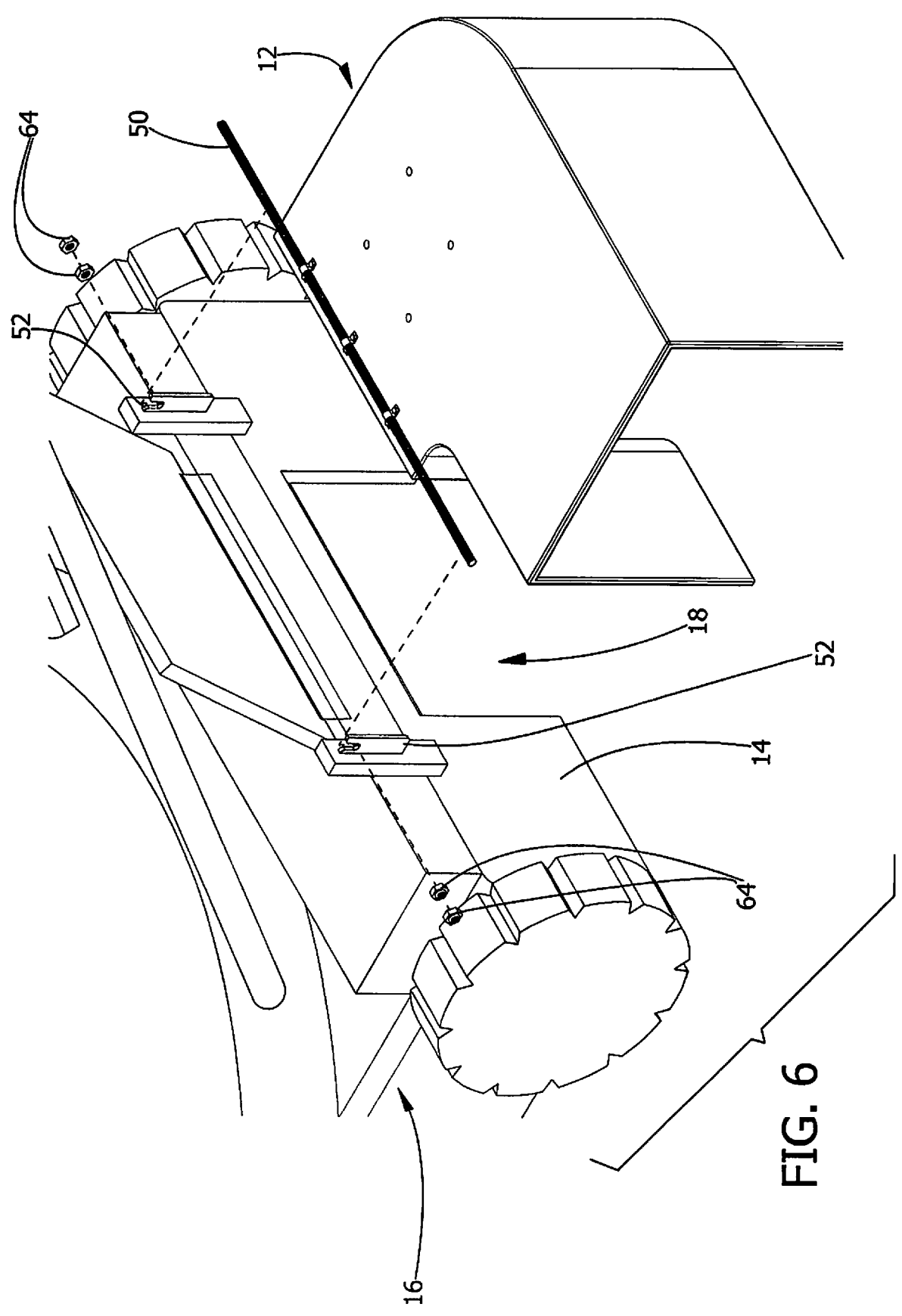
FIG. 6 is an exploded perspective view of an embodiment of the disclosure showing a rod engaging a pair of collection bag mounts on a deck of a lawnmower.
Figure 7:
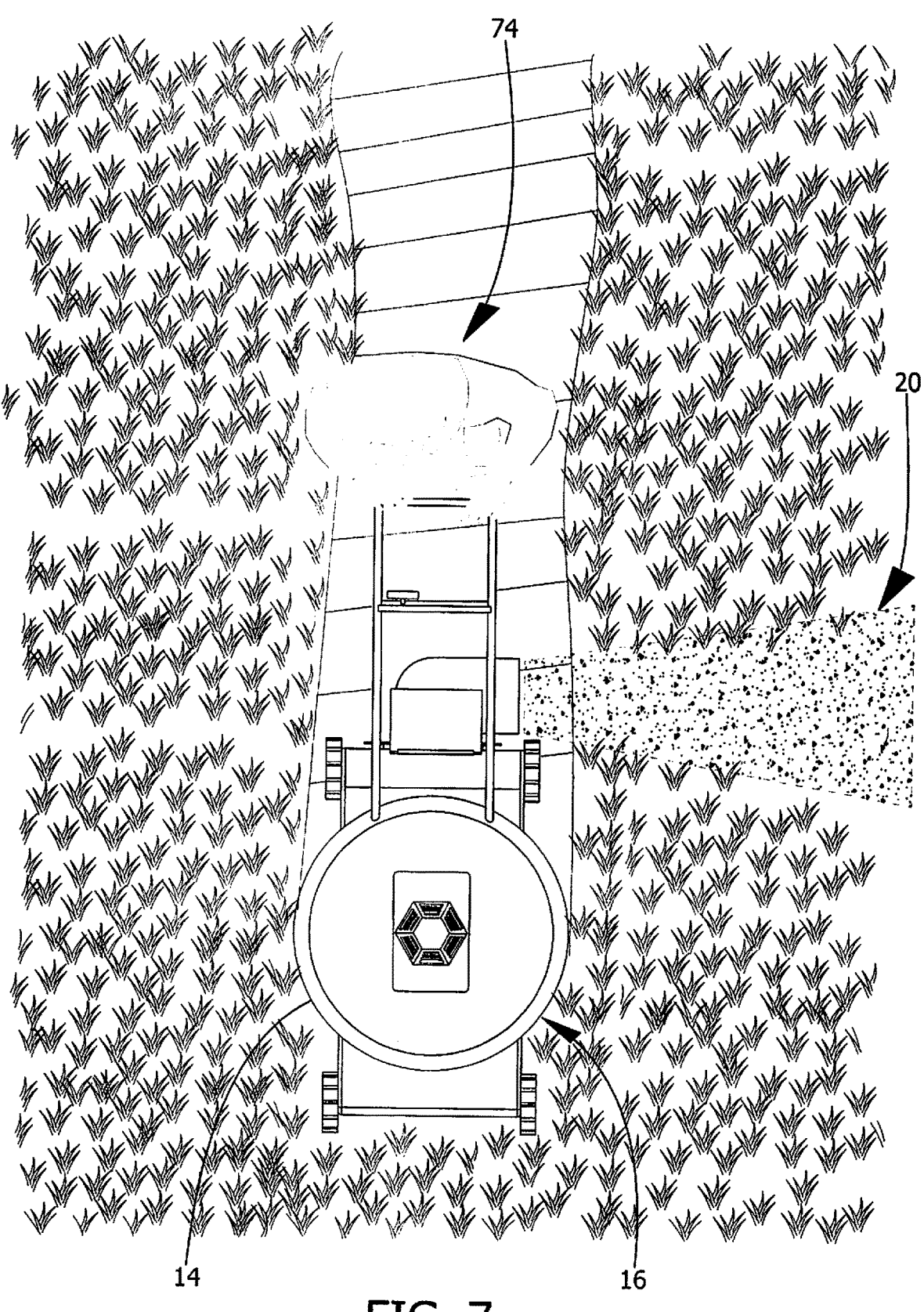
FIG. 7 is a top in-use view of an embodiment of the disclosure.

With reference now to the drawings, and in particular to FIGS. 1 through 9 thereof, a new clipping chute device embodying the principles and concepts of an embodiment of the disclosure and generally designated by the reference numeral 10 will be described.

As best illustrated in FIGS. 1 through 9, the lawnmower clipping chute assembly 10 generally comprises a chute 12 that is mountable to a deck 14 of a push lawnmower 16 having the chute 12 being aligned with an output port 18 of the deck 14. In this way the chute 12 can capture grass clippings 20 produced by the push lawnmower 16 in lieu of a collection bag of the push lawnmower 16. The chute 12 is curved such that the chute 12 is directed laterally from the deck 14 to direct the grass clippings 20 laterally from the deck 14. The push lawnmower 16 may be a push lawnmower of any conventional design, including gas powered lawn-mowers and electric lawnmowers.

The chute 12 has a top wall 22 and a first lateral wall 24 extending downwardly from a first lateral edge 26 of the top wall 22 and a second lateral wall 28 extending downwardly from a second lateral edge 30 of the top wall 22. Each of the first lateral edge 26 and the second lateral edge 30 extends between a front edge 32 and a back edge 34 of the top wall 22. Additionally, the first lateral edge 26 has a first curve 36 that is located between the front edge 32 and the back edge 34 and the first curve 36 is positioned closer to the front edge 32 than the back edge 34. The second lateral edge 30 has a second curve 38 that is located between the front edge 32 and the back edge 34 and the second curve 38 is located closer to the front edge 32 than the back edge 34. Addition-ally, each of the first lateral wall 24 and the second lateral wall 28 extends between the front edge 32 and the back edge 34 to define an entry 40 of the chute 12 and an exit 42 of the chute 12.

The chute 12 has a plurality of first holes 44 each extending through the top wall 22 of the chute 12 and the plurality first holes 44 are spaced apart from each other and are distributed along the front edge 32 of the chute 12. The chute 12 has a plurality of second holes 46 each extending through the top wall 22 of the chute 12 and each of the second holes 46 is spaced from and is aligned with a respective one of the plurality of first holes 44. The chute 12 has a plurality of third holes 48 each extending through the top wall 22 and each of the plurality of third holes 48 is positioned closer to the plurality of second holes 46 than the back edge 34 of the chute 12. The plurality of third holes 48 are arranged such that each of the plurality of third holes 48 defines a respective corner of a rectangle.

A rod 50 is provided that is attachable to the chute 12 such that the rod 50 extends laterally across the chute 12. The rod 50 is positionable in each of a pair of collection bag mounts 52 on the deck 14 of the lawnmower 16 for mounting the chute 12 to the deck 14. Additionally, an outer surface 54 of the rod 50 is threaded along an entire length of the rod 50. The rod 50 is positionable on top of the top wall 22 of the chute 12 having the rod 50 being positioned between the plurality of first holes 44 and the plurality of second holes 46. Additionally, the rod 50 has a length that is greater than a width of the top wall 22 of the chute 12 such that the rod 50 extends outwardly beyond each of the first lateral wall 24 and the second lateral wall 28 of the chute 12.

A plurality of brackets 56 is provided and each of the brackets 56 has a curved portion 58 that is centrally located between a pair of flattened portions 60. The curved portion 58 of each of the brackets 56 is positionable on the rod 50 having each of the pair of flattened portions 60 of each of the plurality of brackets 56 lying on the top wall 22 of the chute 12. Furthermore, each of the flattened portions 60 of each of the plurality of brackets 56 is aligned with a respective one of the plurality of first holes 44 and a respective one of the plurality of second holes 46. A plurality of fasteners 62 is provided and each of the plurality of fasteners 62 is extend-able through a respective one of the flattened portions 60 of a respective one of the plurality of brackets 56. Each of the plurality of fasteners 62 extends through a respective one of the plurality of first holes 44 or a respective one of the plurality of second holes 46 for securing the plurality of brackets 56 to the top wall 22 of the chute 12. Additionally, each of the plurality of fasteners 62 may comprise a nut and a bolt or other type of releasable, mechanical fastener.

A plurality of nuts 64 is provided and each of the plurality of nuts 64 is threadable onto a respective one of a first end

Figure 8:
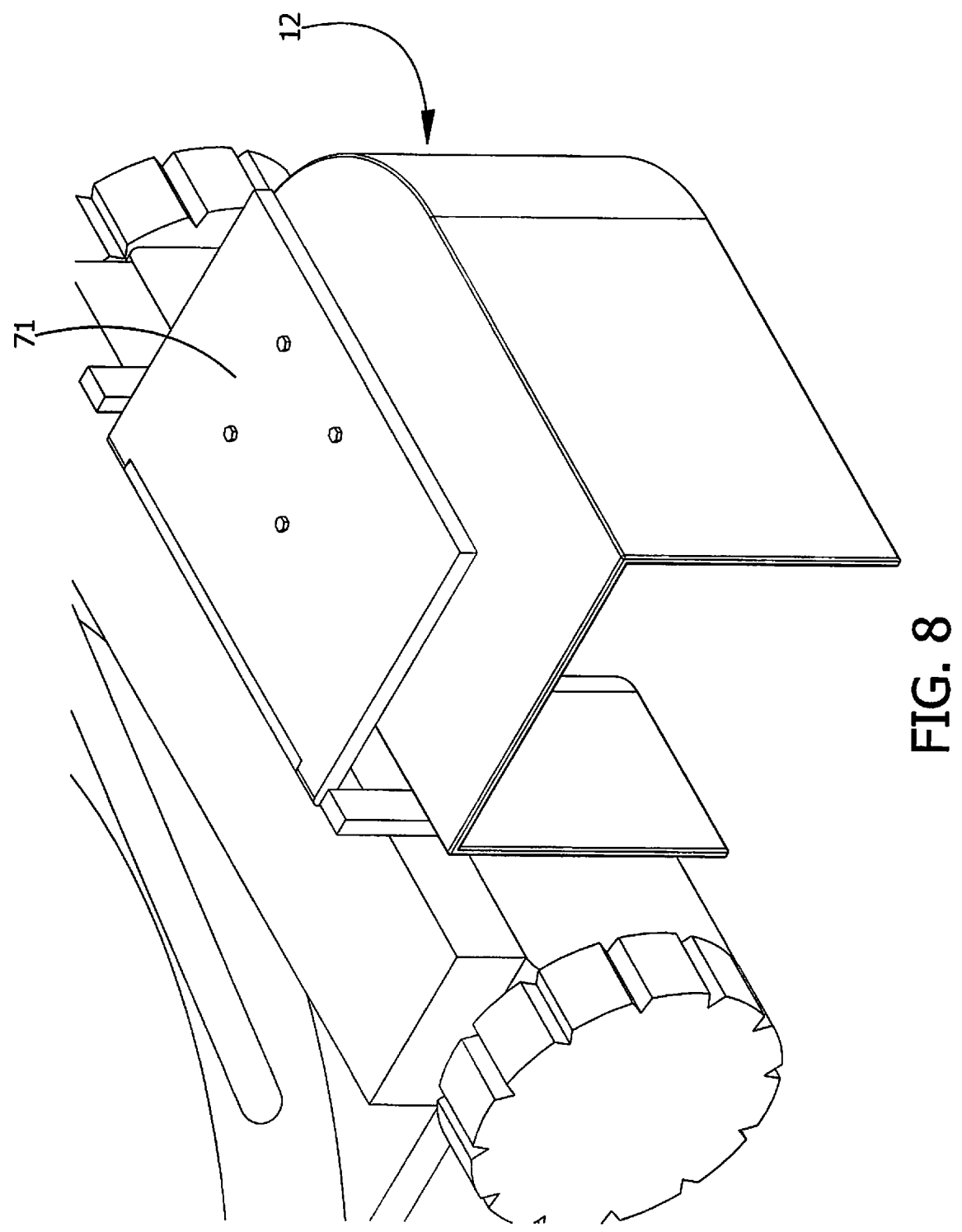
FIG. 8 is a perspective view of an embodiment of the disclosure showing an output door attached to a chute.
Figure 9:
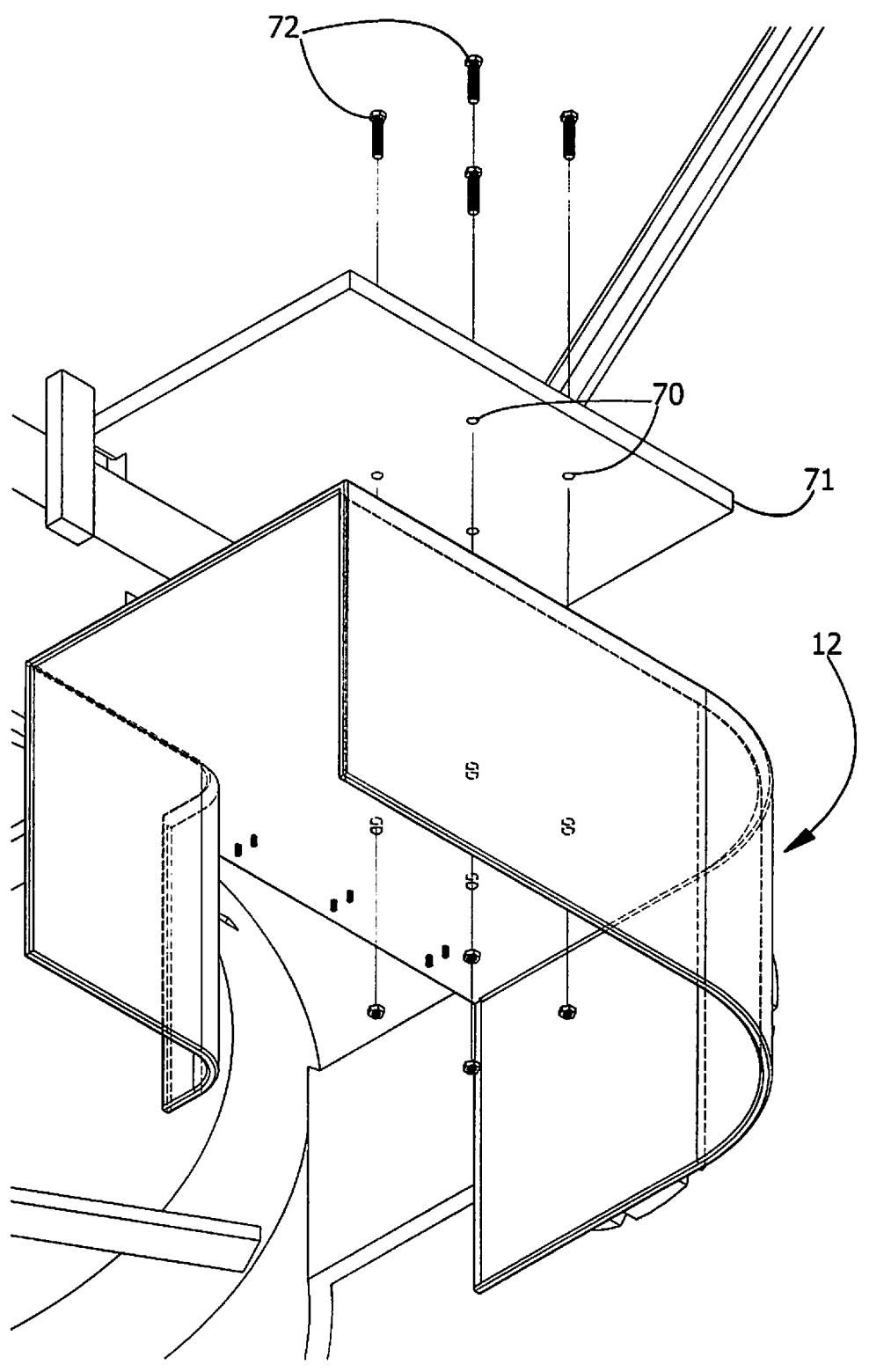
FIG. 9 is an exploded perspective view of an embodiment of the disclosure showing an output door being attached to a chute.

66 or a second end 68 of the rod 50 when the rod 50 is positioned in the pair of collection bag mounts 52. In this way the rod 50 is secured in the pair of collection bag mounts 52 having the entry 40 of the chute 12 being aligned with the output port 18 in the deck 14. As is most clearly shown in FIG. 5, a pair of the nuts 64 may be positioned against each of the collection bag mounts 52 to inhibit the nuts 64 from loosening on the rod 50. As is shown in FIGS. 8 and 9, each of the plurality of third holes 48 in the top wall 22 of the chute 12 may be strategically oriented such that the third holes 48 are aligned with holes 70 in an output port door 71 on the deck 14 of the lawnmower 16. Furthermore, a plurality of fasteners 72, which may include nuts and bolts, may each be extendable through a respective hole 70 in the output port door 71 and a respective one of the third holes 48 for attaching the chute 12 to the output port door 71.

In use, the output port door 71 on the deck 14 of the lawnmower 16 is urged into an open position and the chute 12 is positioned against the deck 14 such that the entry 40 of the chute 12 is aligned with the output port 18 and the output port door 71 rests on the chute 12. Furthermore, the rod 50 is positioned in each of the collection bag mounts 52 and each of the nuts is threaded onto the rod 50 to secure the rod 50 in the collection bag mounts 52. In this way the chute 12 directs the grass clippings 20 laterally away from the push lawnmower 16 while the push lawnmower 16 is being employed for mowing. Thus, a user 74 of the push lawn-mower 16 does not have to repeatedly empty a collection bag while the push lawnmower 16 is being employed for mowing. The chute 12 can be removed from the deck 14 of the push lawnmower 16 at any time to facilitate the grass clippings 20 to be collected in the collection bag to suit the preferences of the user 74.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encom-passed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lawnmower clipping chute assembly for routing grass clippings laterally on a lawnmower in lieu of a collection bag, said assembly comprising:

a chute being mountable to a deck of a push lawnmower having said chute being aligned with an output port of said deck wherein said chute is configured to capture grass clippings produced by said push lawnmower in lieu of a collection bag of said push lawnmower, said chute being curved such that said chute is directed laterally from said deck wherein said chute is config-
ured to direct the grass clippings laterally from said
deck; and a rod being attachable to said chute such that said rod
extends laterally across said chute, said rod being
positionable in each of a pair of collection bag mounts
on said deck of said lawnmower for mounting said
chute to said deck;

wherein said chute has a top wall and a first lateral wall
extending downwardly from a first lateral edge of said
top wall and a second lateral wall extending down-
wardly from a second lateral edge of said top wall;

wherein each of said first lateral edge and said second
lateral edge extends between a front edge and a back
edge of said top wall;

wherein said first lateral edge having a first curve being
located between said front edge and said back edge,
said first curve being positioned closer to said front
edge than said back edge;

wherein said second lateral edge has a second curve being
located between said front edge and said back edge,
said second curve being located closer to said front
edge than said back edge;

wherein each of said first lateral wall and said second
lateral wall extends between said front edge and said
back edge to define an entry of said chute and an exit
of said chute;

wherein said chute has a plurality of first holes each
extending through said top wall of said chute;

wherein said plurality first holes are spaced apart from
each other and are distributed along said front edge of
said chute;

wherein said chute has a plurality of second holes each
extending through said top wall of said chute; and wherein each of said second holes is spaced from and is
aligned with a respective one of said plurality of first
holes.

2. The assembly according to claim 1, wherein said chute
having a plurality of third holes each extending through said
top wall, each of said plurality of third holes being posi-
tioned closer to said plurality of second holes than said back
edge of said chute, said plurality of third holes being
arranged such that each of said plurality of third holes
defines a respective corner of a rectangle.

3. The assembly according to claim 1, wherein said rod
has an outer surface being threaded along an entire length of
said rod, said rod being positionable on top of said top wall
of said chute having said rod being positioned between said
plurality of first holes and said plurality of second holes, said
rod having a length being greater than a width of said top
wall of said chute such that said rod extends outwardly
beyond each of said first lateral wall and said second lateral
wall of said chute.

4. The assembly according to claim 1, further comprising
a plurality of brackets, each of said brackets having a curved
portion being centrally located between a pair of flattened
portions, said curved portion of each of said brackets being
positionable on said rod having each of said pair of flattened
portions of each of said plurality of brackets lying on said
top wall of said chute such that each of said flattened
portions of each of said plurality of brackets is aligned with
a respective one of said plurality of first holes and a
respective one of said plurality of second holes.

5. The assembly according to claim 4, further comprising
a plurality of fasteners, each of said plurality of fasteners
being extendable through a respective one of said flattened
portions of a respective one of said plurality of brackets, each of said plurality of fasteners extending through a
respective one of said plurality of first holes or a respective
one of said plurality of second holes for securing said
plurality of brackets to said top wall of said chute.

6. The assembly according to claim 1, further comprising
a plurality of nuts, each of said plurality of nuts being
threadable onto a respective one of a first end or a second
end of said rod when said rod is positioned in said pair of
collection bag mounts for securing said rod in said pair of
collection bag mounts having said entry of said chute being
aligned with said output port in said deck.

7. A lawnmower clipping chute assembly for routing grass
clippings laterally on a lawnmower in lieu of a collection
bag, said assembly comprising:

a chute being mountable to a deck of a push lawnmower
having said chute being aligned with an output port of
said deck wherein said chute is configured to capture
grass clippings produced by said push lawnmower in
lieu of a collection bag of said push lawnmower, said
chute being curved such that said chute is directed
laterally from said deck wherein said chute is config-
ured to direct the grass clippings laterally from said
deck, said chute having a top wall and a first lateral wall
extending downwardly from a first lateral edge of said
top wall and a second lateral wall extending down-
wardly from a second lateral edge of said top wall, each
of said first lateral edge and said second lateral edge
extending between a front edge and a back edge of said
top wall, said first lateral edge having a first curve being
located between said front edge and said back edge,
said first curve being positioned closer to said front
edge than said back edge, said second lateral edge
having a second curve being located between said front
edge and said back edge, said second curve being
located closer to said front edge than said back edge,
each of said first lateral wall and said second lateral
wall extending between said front edge and said back
edge to define an entry of said chute and an exit of said
chute, said chute having a plurality of first holes each
extending through said top wall of said chute, said
plurality first holes being spaced apart from each other
and being distributed along said front edge of said
chute, said chute having a plurality of second holes
each extending through said top wall of said chute, each
of said second holes being spaced from and being
aligned with a respective one of said plurality of first
holes, said chute having a plurality of third holes each
extending through said top wall, each of said plurality
of third holes being positioned closer to said plurality
of second holes than said back edge of said chute, said
plurality of third holes being arranged such that each of
said plurality of third holes defines a respective corner
of a rectangle;

a rod being attachable to said chute such that said rod
extends laterally across said chute, said rod being
positionable in each of a pair of collection bag mounts
on said deck of said lawnmower for mounting said
chute to said deck, said rod having an outer surface
being threaded along an entire length of said rod, said
rod being positionable on top of said top wall of said
chute having said rod being positioned between said
plurality of first holes and said plurality of second
holes, said rod having a length being greater than a
width of said top wall of said chute such that said rod
extends outwardly beyond each of said first lateral wall
and said second lateral wall of said chute;

a plurality of brackets, each of said brackets having a curved portion being centrally located between a pair of flattened portions, said curved portion of each of said brackets being positionable on said rod having each of said pair of flattened portions of each of said plurality of brackets lying on said top wall of said chute such that each of said flattened portions of each of said plurality of brackets is aligned with a respective one of said plurality of first holes and a respective one of said plurality of second holes;

a plurality of fasteners, each of said plurality of fasteners being extendable through a respective one of said flattened portions of a respective one of said plurality of brackets, each of said plurality of fasteners extending through a respective one of said plurality of first holes or a respective one of said plurality of second holes for securing said plurality of brackets to said top wall of said chute; and a plurality of nuts, each of said plurality of nuts being threadable onto a respective one of a first end or a second end of said rod when said rod is positioned in said pair of collection bag mounts for securing said rod in said pair of collection bag mounts having said entry of said chute being aligned with said output port in said deck.

* * * * *